United States Patent
Cheng et al.

(10) Patent No.: US 7,295,729 B2
(45) Date of Patent: Nov. 13, 2007

(54) CONICAL-WEDGE-SHAPED LENSED FIBER AND THE METHOD OF MAKING THE SAME

(75) Inventors: Wood-Hi Cheng, Kaohsiung (TW); Szu-Ming Yeh, Kaohsiung (TW)

(73) Assignee: National Sun Yat-Sen University, Taiwan (TW)

( * ) Notice: Subject to any disclaimer, the term of this patent is extended or adjusted under 35 U.S.C. 154(b) by 0 days.

(21) Appl. No.: 11/183,406

(22) Filed: Jul. 18, 2005

(65) Prior Publication Data

US 2007/0086714 A1  Apr. 19, 2007

(30) Foreign Application Priority Data

Jan. 21, 2005  (TW) .............................. 94101850 A

(51) Int. Cl.
*G02B 6/32* (2006.01)
*G02B 6/26* (2006.01)
*G02B 6/42* (2006.01)

(52) U.S. Cl. .......................................... 385/33; 385/43

(58) Field of Classification Search .................. 385/43, 385/33
See application file for complete search history.

(56) References Cited

U.S. PATENT DOCUMENTS

| 4,671,609 A | 6/1987 | Khoe et al. |
| 5,037,174 A | 8/1991 | Thompson |
| 5,256,851 A | 10/1993 | Presby |
| 5,455,879 A | 10/1995 | Modavis et al. |
| 5,845,024 A * | 12/1998 | Tsushima et al. .............. 385/33 |
| 2001/0012425 A1 | 8/2001 | Irie et al. |
| 2002/0031300 A1 | 3/2002 | Jie et al. |
| 2002/0159693 A1* | 10/2002 | Wolak et al. .................. 385/33 |

OTHER PUBLICATIONS

Yeh, Szu-Ming, et al. "A Novel Scheme of Lensed Fiber Employing a Quadrangular-Pyramid-Shaped Fiber Endface for Coupling Between High-Power Laser Diodes and Single-Mode Fibers." *Journal of Lightwave Technology* vol. 22, No. 4 (2004) pp. 1-6.

Yeh, Szu-Ming, et al. "A New Scheme of Conical-Wedge-Shaped Fiber Endface for Coupling Between High-Power Laser Diodes and Single-Mode Fibers." *Journal of Lightwave Technology* vol. 23, No. 4 (2005) pp. 1781-1786.

* cited by examiner

*Primary Examiner*—Frank G. Font
*Assistant Examiner*—Erin D. Chiem
(74) *Attorney, Agent, or Firm*—Ladas & Parry LLP

(57) ABSTRACT

The present invention relates to a conical wedge-shaped lensed fiber and the method of making the same. The method comprises: (a) providing an optical fiber having a central axis and an end; (b) machining the end of the optical fiber to form a flat end face; (c) machining the end of the optical fiber to form a conical region; (d) machining one side of the conical region to form a flat first surface; (e) machining another side of the conical region to form a flat third surface, wherein the first surface and the third surface intersect at a intersecting line that is perpendicular to the central axis; and (f) fusing the intersecting line to form a lens. The method has simplified fabricating processes and need not to set up any particular angle of rotation of the fiber. Therefore, the fabricating time and cost are reduced, and the coupling efficiency of the lensed fiber is up to 90%.

10 Claims, 7 Drawing Sheets

CONICAL-WEDGE-SHAPED LENSED FIBER AND THE METHOD OF MAKING THE SAME

FIELD OF THE INVENTION

The present invention relates to a lensed fiber and the method of making the same, particularly to a conical-wedge-shaped lensed fiber and the method of making the same.

DESCRIPTION OF THE RELATED ART

For optimal performance in fiber-optic communication system, efficient coupling between diode laser and fiber is essential. In order to enhance the coupling efficiency between diode laser and fiber, various types of lensed fibers are provided as follows.

Referring to FIG. 1, U.S. Pat. No. 4,671,609 disclosed a method of making a lensed fiber comprising the following steps. A fiber 10 was pulled to form a tapered end that has a flat end face 12 or a rounded tip. A lens 14 is formed by immersing the tapered end of the fiber 10 in molten glass and then withdrawing the tapered end from the molten glass. The dimensions and the shape of the lens 14 can be influenced by the immersion depth, the angles of the tapered end, the shape of the tapered end and the temperature of the molten glass, which cause the manufacturing process to be complicated, time consuming and difficult to control, which are the disadvantages of this method. In addition, the rounded lensed fiber fabricated by this method is only suitable for the laser of low aspect ratio.

Referring to FIG. 2, U.S. Pat. No. 5,037,174 disclosed a method for making a tapered fiber comprising the following steps. A fiber was drawn to be separated into two parts by jerking separation and little heat of arc energy, and a tapered extension 22 and a nipple-like extension 24 were formed on the end of one part. Then, the application of a burst of arc softened the nipple-like extension 24 to form a hyperbolic shaped fiber lens 26. The disadvantage of this method is that the dimensions and the shapes of the tapered extension 22 and nipple-like extension 24 are difficult to control and unstable during the manufacturing process. In addition, the rounded lensed fiber fabricated by this method is only suitable for the laser of low aspect ratio.

Referring to FIG. 3, U.S. Pat. No. 5,256,851 disclosed a method for making a tapered fiber comprising the following steps. A fiber 30 was rotated along the axis thereof, and then a $CO_2$ laser controlled by computer program was applied to the fiber 30 to form a lens consisting of a hyperbolical portion 32 on an axis and a spherical portion 34 on another axis. Such a fiber lens has high coupling efficiency, but it is very difficult to fabricate a fiber lens having a highly asymmetric curve.

Referring to FIG. 4, U.S. Pat. No. 5,455,879 disclosed a double wedge-shaped optical fiber having a lens of a wedge-shaped external form having two-stage tapered portions and with different angles of $\theta_1$ and $\theta_2$ between the two slants and the axis 42, respectively, wherein the intersection of the two slants must be controlled to be within the scope of the core of the fiber. In addition, as the radius of the core of the fiber is usually 4 to 6 μm, it is very difficult to control the intersection of the two slants to be within the scope of the core of the fiber. Furthermore, the lensed fiber fabricated by this method is only suitable for the laser of high aspect ratio.

Consequently, there is a need for improved lensed fiber and the method of making the same to solve the above-mentioned problem.

SUMMARY OF THE INVENTION

The primary objective of the present invention is to provide a method for making a conical-wedge-shaped lensed fiber, which has simplified fabricating process and needs not to set up any particular angle of rotation of the fiber. Therefore, the fabricating time and cost are reduced, and the coupling efficiency of the lensed fiber is up to 90%.

Another objective of the present invention is to provide a method for making a conical-wedge-shaped lensed fiber. In comparison to other fabrication techniques of lensed fiber used in high-power diode lasers, the advantages of the present invention are the ability to control over two axial curvatures and the small fiber offset in grinding and polishing processes, resulting in producing a good elliptical microlens in the fusing process.

To achieve the above objectives, the present invention provides a method for making a conical-wedge-shaped lensed fiber, comprising the following steps:

(a) providing an optical fiber having a central axis and an end;
(b) machining the end of the optical fiber to form a flat end face;
(c) machining the end of the optical fiber to form a conical region;
(d) machining one side of the conical region to form a flat first surface;
(e) machining another side of the conical region to form a flat third surface, wherein the first surface and the third surface intersect at an intersecting line that is perpendicular to the central axis; and
(f) fusing the intersecting line to form a lens.

BRIEF DESCRIPTION OF THE DRAWINGS

FIG. 5b is a top view of the conical-wedge-shaped fiber of FIG. 5a;

FIG. 5c is a side view of the conical-wedge-shaped fiber of FIG. 5a;

FIG. 5d is a front view of the conical-wedge-shaped fiber of FIG. 5a;

FIG. 6b is a top view of the conical-wedge-shaped lensed fiber of FIG. 6a;

FIG. 6c is a side view of the conical-wedge-shaped lensed fiber of FIG. 6a;

FIG. 6d is a front view of the conical-wedge-shaped lensed fiber of FIG. 6a;

DETAILED DESCRIPTION OF THE INVENTION

Figure 1:
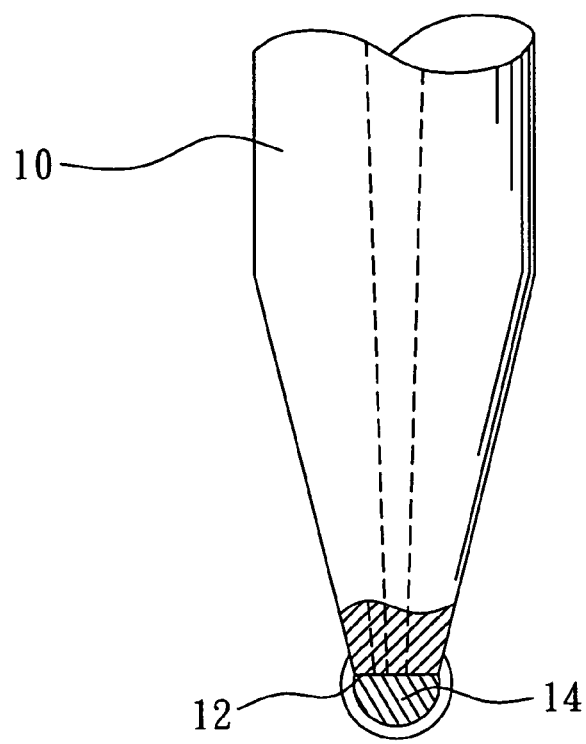
FIG. 1 shows a conventional lensed fiber of U.S. Pat. No. 4,671,609.
Figure 2:
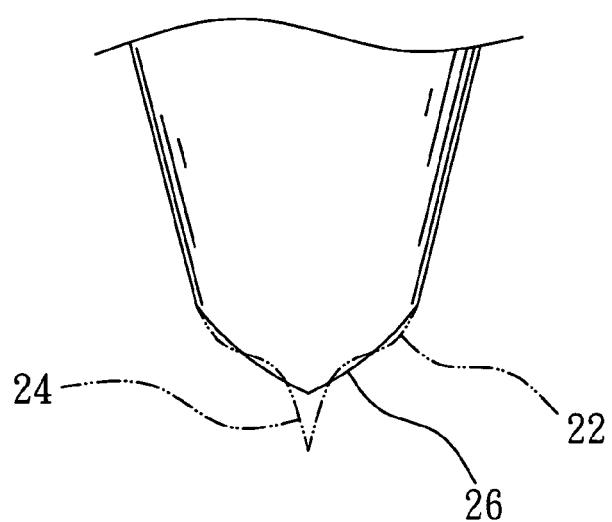
FIG. 2 shows a conventional method disclosed in U.S. Pat. No. 5,037,174, in which the tapered fiber is fabricated by arc welding.
Figure 3:
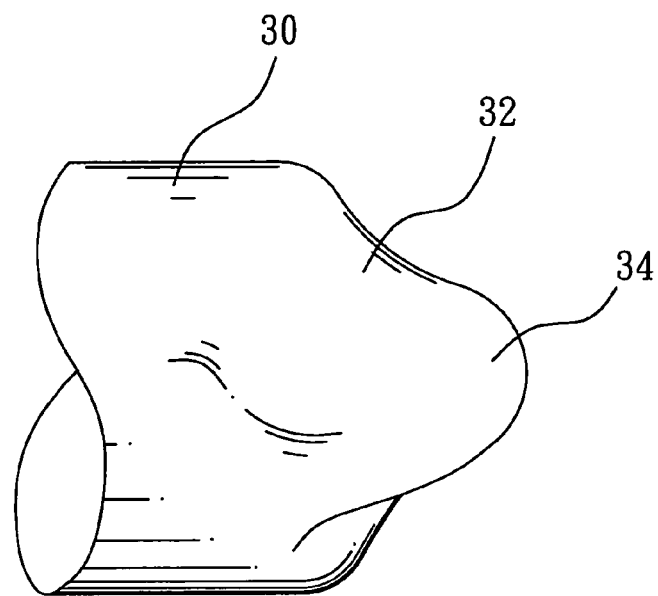
FIG. 3 shows a conventional asymmetric lensed fiber of U.S. Pat. No. 5,256,851.
Figure 4:
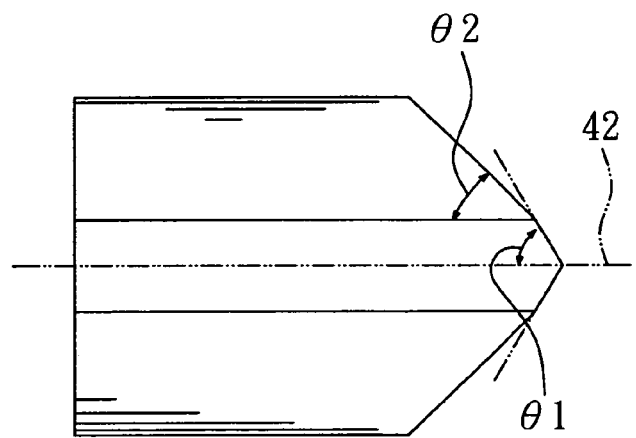
FIG. 4 shows a conventional wedge lensed fiber of U.S. Pat. No. 5,455,879.
Figure 5A:
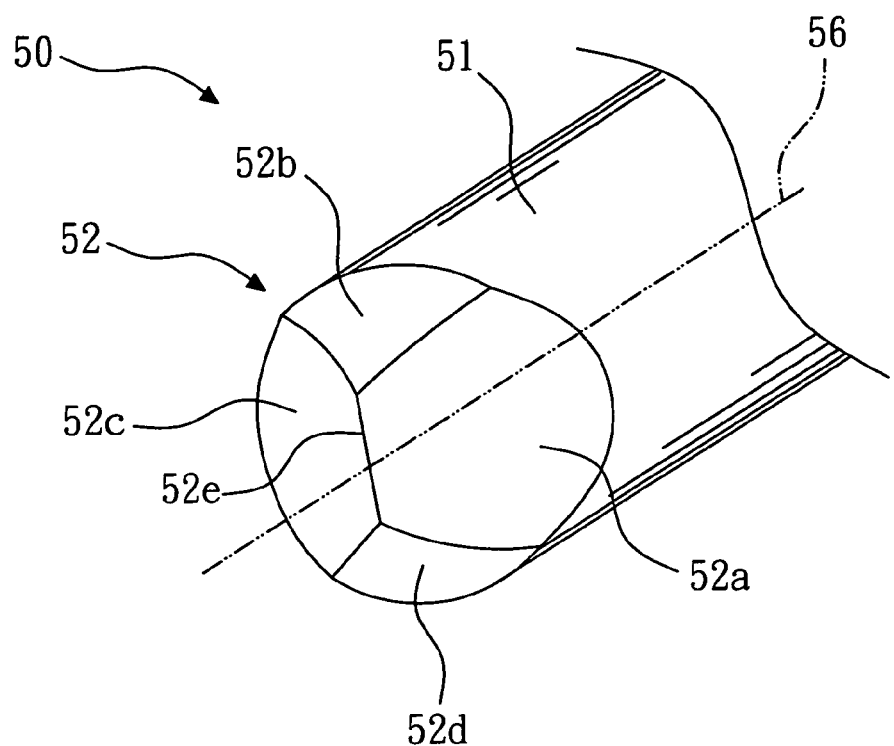
FIG. 5a is a perspective view of a conical-wedge-shaped fiber according to the preferred embodiment of the present invention.

Referring to FIG. 5a, a conical-wedge-shaped fiber according to the preferred embodiment of the present invention is shown. The conical-wedge-shaped fiber 50 is fabricated by machining, such as polishing, an end of an optical fiber 51 having a core and a cladding to form a conical-wedge-shaped appearance. The conical-wedge-shaped fiber 50 comprises an optical fiber 51 and a tapered region 52.

The optical fiber 51 has a central axis 56 and an end, wherein the central axis 56 extends in the longitudinal direction of the optical fiber 51. The tapered region 52 is at the end of the optical fiber 51. The sides of the tapered region 52 are a first surface 52a, a second surface 52b, a third surface 52c and a fourth surface 52d in sequence. The top of the tapered region 52 is an intersecting line 52e. Preferably, the intersecting line 52e is a straight line and its length is 10 to 40 µm, most preferably, 30 µm. The first surface 52a and the third surface 52c are flat planes and intersect at the intersecting line 52e. The second surface 52b and the fourth surface 52d are curved surfaces and they do not intersect.

Figure 5B:
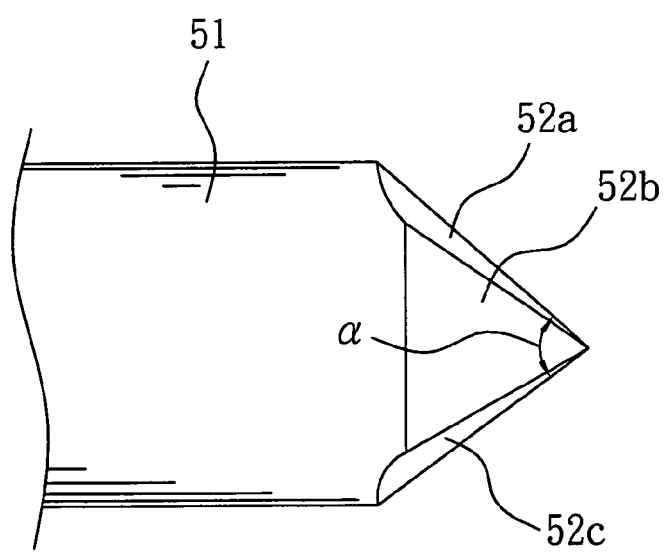

Referring to FIG. 5b, a top view of the conical-wedge-shaped fiber of FIG. 5a is shown. As shown in the figure, there is an inclination angle α between the first surface 52a and the third surface 52c, wherein α is 10 degrees to 170 degrees.

Figure 5C:
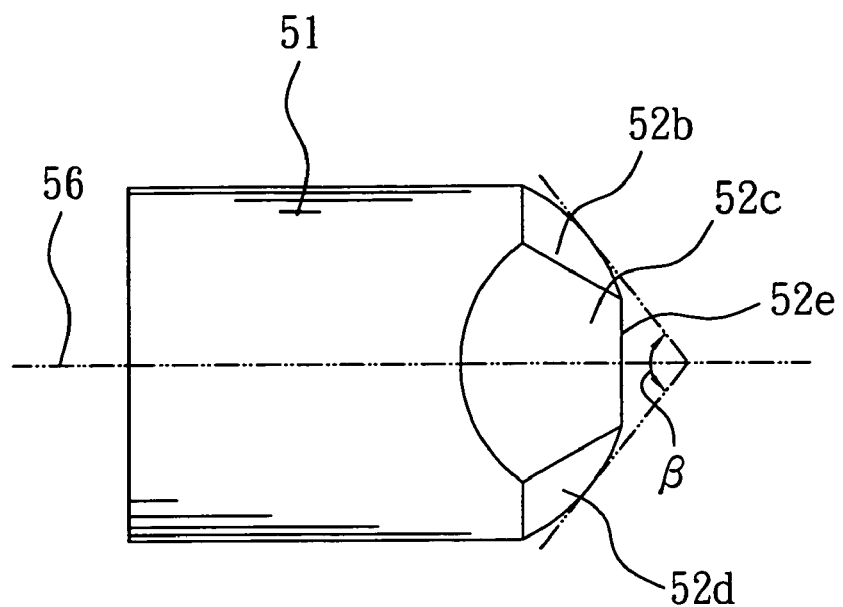

Referring to FIG. 5c, a side view of the conical-wedge-shaped fiber of FIG. 5a is shown. As shown in the figure, the second surface 52b and the fourth surface 52d are curved surfaces. There is an inclination angle β between the tangent line of the second surface 52b and the tangent line of the fourth surface 52d, wherein β is 10 degrees to 170 degrees. The intersecting line 52e is a straight line and perpendicular to the central axis 56.

Figure 5D:
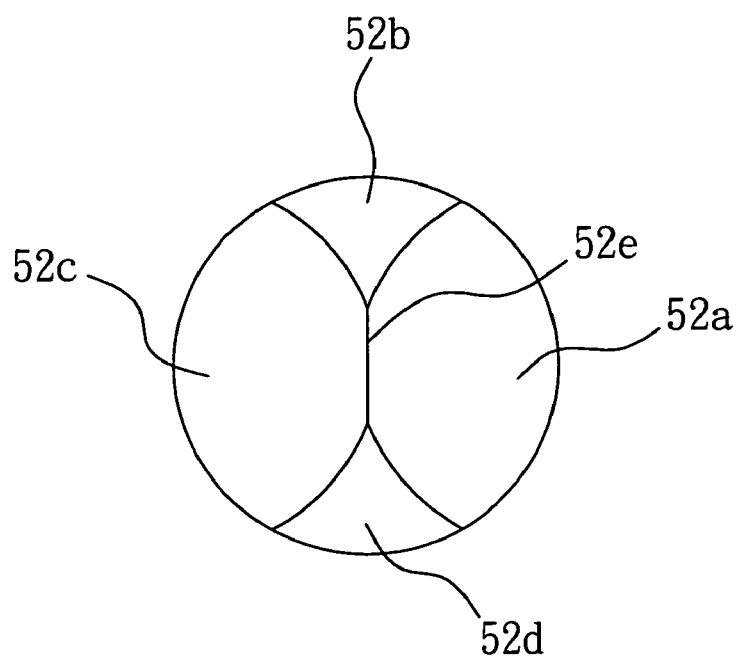

Referring to FIG. 5d, a front view of the conical-wedge-shaped fiber of FIG. 5a is shown. Because the first surface 52a and the third surface 52c are flat planes, and the second surface 52b and the fourth surface 52d are curved surfaces, the intersecting lines between the first surface 52a and the second surface 52b and the fourth surface 52d respectively are curved lines; and the intersecting lines between the third surface 52c and the second surface 52b and the fourth surface 52d respectively are also curved lines.

Figure 6A:
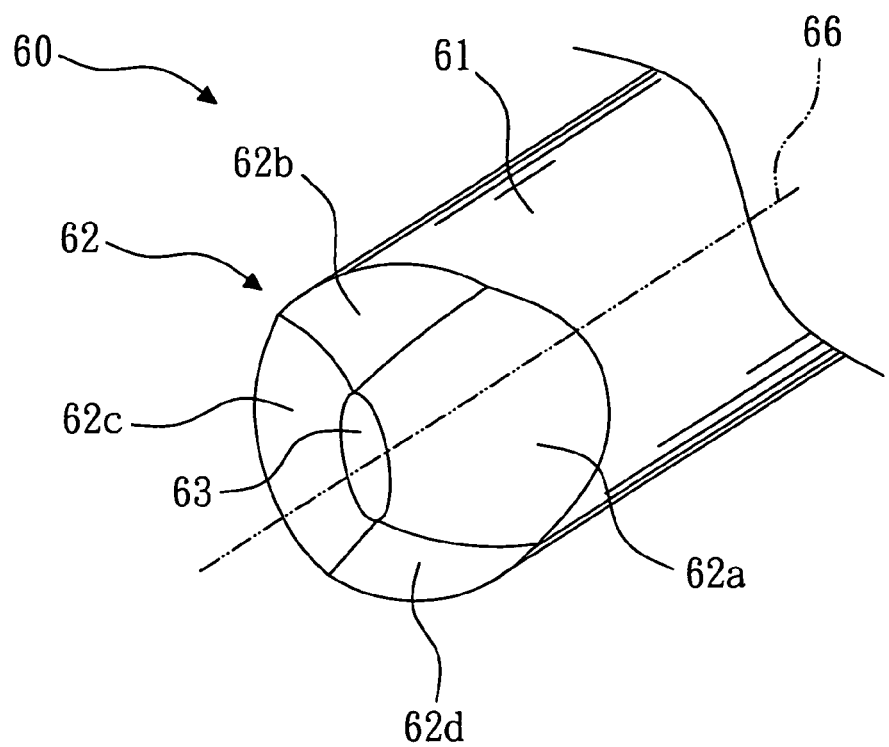
FIG. 6a is a perspective view of a conical-wedge-shaped lensed fiber according to the preferred embodiment of the present invention.

Referring to FIG. 6a, a perspective view of a conical-wedge-shaped lensed fiber according to the preferred embodiment of the present invention is shown. In this embodiment, a conical-wedge-shaped lensed fiber 60 is formed by fusing the neighborhood area of the intersecting line 52e of the conical-wedge-shaped fiber 50. The elements in FIGS. 6a to 6d are substantially same as those in FIGS. 5a to 5d, and are designated by the reference numbers of FIGS. 5a to 5d plus 10. In the embodiment, the conical-wedge-shaped lensed fiber 60 comprises an optical fiber 61, a tapered region 62 and a lens 63.

The optical fiber 61 has a central axis 66 and an end, wherein the central axis 66 extends in the longitudinal direction of the optical fiber 61. The tapered region 62 is at the end of the optical fiber 61. The sides of the tapered region 62 are a first surface 62a, a second surface 62b, a third surface 62c and a fourth surface 62d in sequence. The top of the tapered region 62 is the lens 63. Preferably, the lens 63 is semi-ellipsoidal. The first surface 62a and the third surface 62c are flat planes and the extensions of the first surface 62a and the third surface 62c intersect at an intersecting line (not shown) that is perpendicular to the central axis 66. The second surface 62b and the fourth surface 62d are curved surfaces and they do not intersect.

Figure 6B:
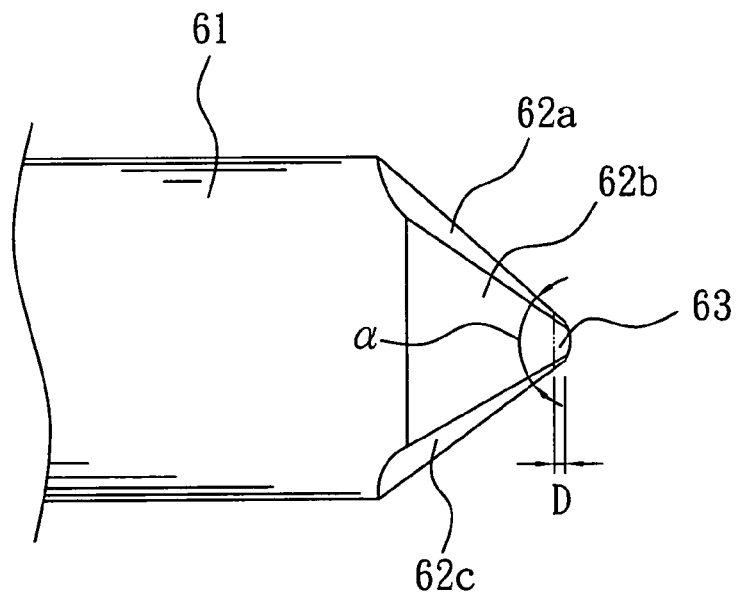

Referring to FIG. 6b, a top view of the conical-wedge-shaped lensed fiber of FIG. 6a is shown. As shown in the figure, there is an inclination angle γ (γ is equal to α), wherein γ is 10 degrees to 170 degrees. D is the depth of fusing, which is 1 to 125 µm.

Figure 6C:
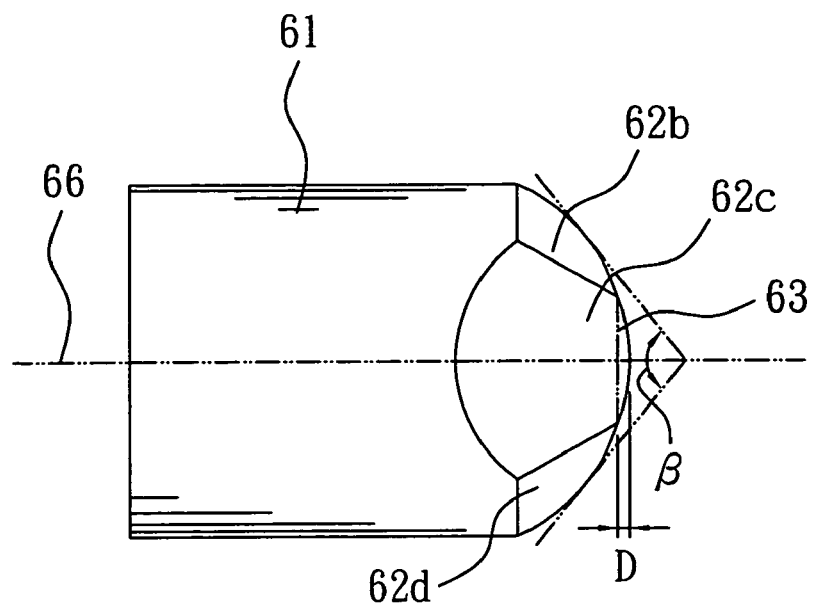

Referring to FIG. 6c, a side view of the conical-wedge-shaped lensed fiber of FIG. 6a is shown. As shown in the figure, the second surface 62b and the fourth surface 62d are curved surfaces. There is an inclination angle δ (δ is equal to β) between the tangent line of the second surface 62b and the tangent line of the fourth surface 62d, wherein δ is 10 degrees to 170 degrees.

Figure 6D:
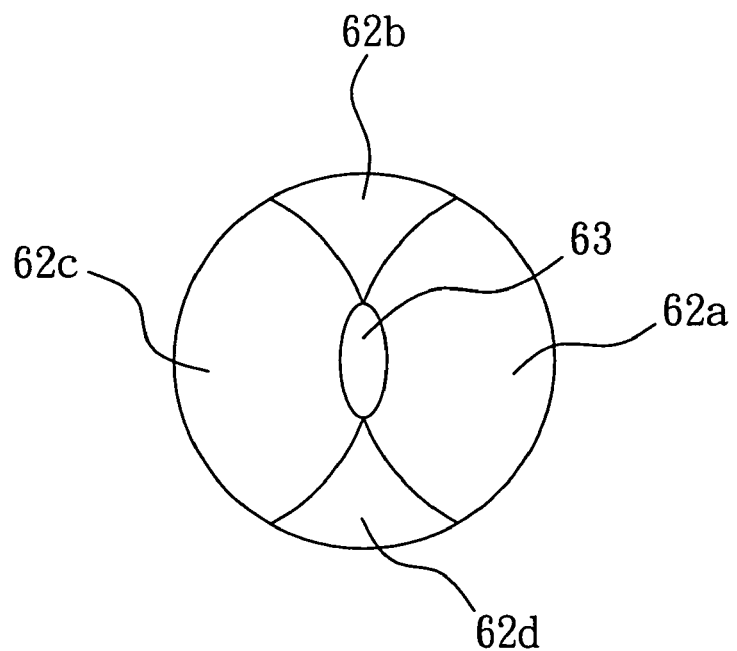

Referring to FIG. 6d, a front view of the conical-wedge-shaped lensed fiber of FIG. 6a is shown. Because the first surface 62a and the third surface 62c are flat planes, and the second surface 62b and the fourth surface 62d are curved surfaces, the intersecting lines between the first surface 62a and the second surface 62b and the fourth surface 62d respectively are curved lines; and the intersecting lines between the third surface 62c and the second surface 62b and the fourth surface 62d respectively are also curved lines.

The lens 63 is at the top of the tapered region 62, and the geometric center of the lens 63 is on the central axis 66. The appearance of the lens 63 can be semi-ellipsoidal or hemispherical.

The present invention also relates to a method for making a conical-wedge-shaped lensed fiber, comprising:
(a) providing an optical fiber having a central axis and an end;
(b) machining (for example, cutting) the end of the optical fiber to form a flat end face;
(c) machining (for example, lapping, polishing or grinding) the end of the optical fiber to form a conical region;
(d) machining (for example, lapping, polishing or grinding) one side of the conical region to form a flat first surface;
(e) machining (for example, lapping, polishing or grinding) another side of the conical region to form a flat third surface, wherein the first surface and the third surface intersect at a intersecting line that is perpendicular to the central axis, and the appearance of the optical fiber is like the above-mentioned conical-wedge-shaped fiber 50; and
(f) fusing the intersecting line to form a lens, wherein the appearance of the lensed fiber is like the above-mentioned conical-wedge-shaped lensed fiber 60.

Figure 7:
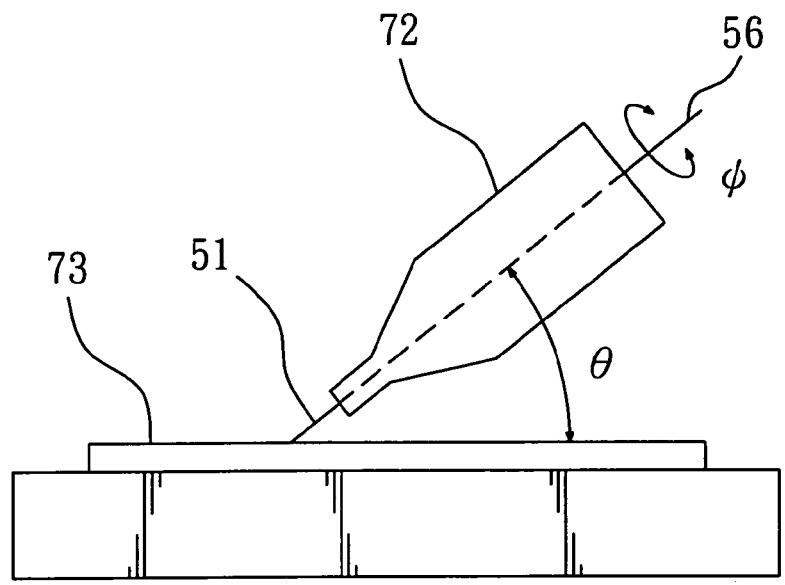
FIG. 7 shows the machining apparatus of the present invention.

Referring to FIG. 7, in the embodiment, the above-mentioned machining step of step (c) is a grinding step and comprises the following steps (taking the fabrication of the conical-wedge-shaped fiber 50 for example):
(c1) fixing the optical fiber 51 in a fixture 72 above a machining plate 73 (for example, lapping plate, grinding plate or polishing plate);
(c2) adjusting the inclination angle between the fixture 72 and the machining plate 73 to form a first angle θ between the optical fiber 51 and the surface of the machining plate 73, and then positioning the end of the optical
(c3) rotating the optical fiber 51 along the central axis 56, feeding the optical fiber 51 to the machining plate 73, and preferably rotating the machining plate 73 simultaneously so as to form a conical region at the end of the optical fiber 51.

Then, in the embodiment, the above-mentioned step (d) comprises the following steps:

(d1) stopping the optical fiber 51 from rotating;
(d2) rotating the machining plate 73, and feeding the optical fiber 51 to the machining plate 73 so as to form the first surface 52a.

Then, in the embodiment, the above-mentioned step (e) comprises the following steps:
(e1) elevating the optical fiber 51 with respect to machining plate 73;
(e2) rotating the optical fiber 51 along the central axis 56 with 180 degrees; and
(e3) feeding the optical fiber 51 downward to the machining plate 73 to form the third surface 52c, and forming the intersecting line 52e. So far, the appearance of the optical fiber 51 is like the above-mentioned conical-wedge-shaped fiber 50.

Finally, in the embodiment, the above-mentioned step (f) is fusing the neighborhood area of the intersecting line 52e by electric arcs so that the neighborhood area of the intersecting line 52e is melted to become liquid state and then forms a lens 63 (FIG. 6a) by surface tension, wherein the appearance of the fiber lens is like the above-mentioned quadrangular-pyramid-shaped lensed fiber 60 of FIG. 6a.

Preferably, after the step (e), the embodiment further comprises a step of chemically etching the intersecting line 52e to form a concave shape. The chemically etching step can improve the radius of curvature of the lens 63 and raise the coupling efficiency of the quadrangular-pyramid-shaped lensed fiber 60

The advantage of the present invention is simplified fabricating process and that it need not to set up any particular angle of rotation of the optical fiber 51. That is, after the conical region is formed in step (c), the optical fiber 51 is fed to the machining plate 73 directly to formed the first surface 52a, and need not to set up any particular angle of rotation of the optical fiber 51. Then, in step (e), the optical fiber 51 is rotated with 180 degrees and machined to form the third surface 52c. Therefore, the fabricating time and cost are reduced, and the coupling efficiency of the lensed fiber is up to 90%.

An example is described below. In the example, a 980-nm high-power diode laser with a typical far-field divergence of 7° (horizontal)×30° (vertical) is used, and the fiber used in this example is a 980-nm step-index single-mode fiber (produced by Prime Optical Fiber Corporation) with the mold field radius of 5.7 µm, while the refractive index of the core is 1.416.

Figure 8:
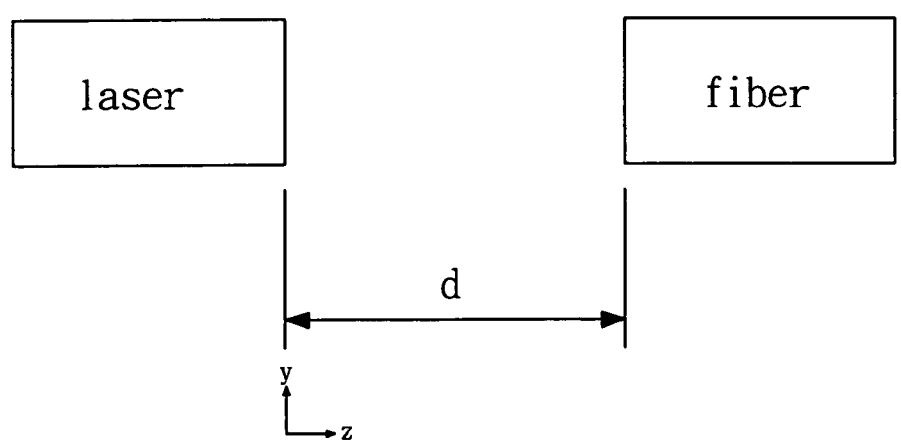
FIG. 8 shows the relative position between a laser and a optical fiber.

Then, the relative position between the laser and the fiber is defined. As shown in FIG. 8, the x direction is perpendicular to the paper, and the distance between the laser and the fiber along z direction is defined as the working distance d. From the simulation result diagram, the coupling efficiency is 90% when the working distance d is 6.0 µm.

While several embodiments of this invention have been illustrated and described, various modifications and improvements can be made by those skilled in the art. The embodiments of this invention are therefore described in an illustrative but not restrictive sense. It is intended that this invention may not be limited to the particular forms as illustrated, and that all modifications that maintain the spirit and scope of this invention are within the scope as defined in the appended claims.

What is claimed is:

1. A conical-wedge-shaped lensed fiber comprising:
an optical fiber having a central axis and an end; and
a tapered region at the end of the optical fiber, the tapered region having a first surface, a second surface, a third surface and a fourth surface in sequence, the top of the tapered region forming a lens, wherein the first surface and the third surface are flat planes, extensions of the first surface and the third surface intersect at an intersecting line, and the second surface and the fourth surface are curved surfaces, wherein the second surface and the fourth surface do not intersect one another.

2. The conical-wedge-shaped lensed fiber according to claim 1, wherein the intersecting line is a straight line and perpendicular to the central axis.

3. The conical-wedge-shaped lensed fiber according to claim 1, wherein the first surface and the third surface form an inclination angle between 10 degrees to 170 degrees.

4. The conical-wedge-shaped lensed fiber according to claim 1, wherein a tangent line of the second surface and a tangent line of the fourth surface form an inclination angle between 10 degrees to 170 degrees.

5. The conical-wedge-shaped lensed fiber according to claim 1, wherein a geometric center of the lens is on the central axis.

6. The conical-wedge-shaped lensed fiber according to claim 1, wherein the lens is semi-ellipsoidal.

7. The conical-wedge-shaped lensed fiber according to claim 1, wherein the lens extends above the first, second, third, and fourth surfaces.

8. The conical-wedge-shaped lensed fiber according to claim 7, wherein the lens extends above the first, second, third, and fourth surfaces by between 1 to 125 µm.

9. The conical-wedge-shaped lensed fiber according to claim 1, wherein the lens has a depth of between 1 to 125 µm.

10. The conical-wedge-shaped lensed fiber according to claim 1, wherein the lens and the first, second, third, and fourth surfaces form five distinct surfaces on the tapered region.

* * * * *